United States Patent [19]

Beall et al.

[11] Patent Number: 5,491,116
[45] Date of Patent: Feb. 13, 1996

[54] FINE-GRAINED GLASS-CERAMICS

[75] Inventors: George H. Beall, Big Flats; Linda R. Pinckney, Corning, both of N.Y.

[73] Assignee: Corning Incorporated, Corning, N.Y.

[21] Appl. No.: 415,791

[22] Filed: Apr. 3, 1995

[51] Int. Cl.⁶ .................................................. C03C 10/04
[52] U.S. Cl. .................. 501/5; 501/10; 65/33.1; 428/694 ST
[58] Field of Search ............................ 501/5, 10; 65/33.1; 428/694 ST

[56] References Cited

U.S. PATENT DOCUMENTS

| | | |
|---|---|---|
| 2,920,961 | 1/1960 | Stookey . |
| 3,268,315 | 8/1966 | Stookey . |
| 3,873,329 | 3/1975 | Beall . |
| 3,936,287 | 2/1976 | Beall et al. . |
| 4,687,749 | 8/1987 | Beall . |

*Primary Examiner*—Karl Group
*Attorney, Agent, or Firm*—Milton M. Peterson

[57] ABSTRACT

A glass-ceramic article, such as an information disk substrate, and a method of making the article. The glass-ceramic has Mg-rich pyroxene and spinel-type predominate crystal phases and a composition at least 92% of which consists essentially of 35–60% $SiO_2$, 10–30% $Al_2O_3$, 12–30% MgO, 0–10% ZnO, 5–20% $TiO_2$, and 0–8% NiO.

24 Claims, No Drawings

FINE-GRAINED GLASS-CERAMICS

RELATED APPLICATION

U.S. application Ser. No. 08/332,703 was filed by us on Nov. 01, 1994 under the title HIGH MODULUS GLASS-CERAMICS CONTAINING FINE GRAINED SPINEL-TYPE CRYSTALS, and is assigned to a common assignee. That application is directed to glass-ceramics having a Young's Modulus between 14 and $24 \times 10^6$ psi and a fracture toughness in excess of 1.0 MPam$^{1/2}$, having spinel-type crystals dispersed in a siliceous glass matrix as a predominant crystal phase, and having compositions consisting essentially of, in weight percent on an oxide basis, 35–60% $SiO_2$, 20–35% $Al_2O_3$, 0–25% MgO, 0–25% ZnO, at least 10% MgO+ZnO, 0–20% $TiO_2$, 0–10% $ZrO_2$, 0–2% $Li_2O$ and 0–8% NiO, 0–5% $R_2O$, 0–8% transition metal oxides and up to 5 % optional constituents.

FIELD OF THE INVENTION

The field is nanocrystalline glass-ceramics having Mg-rich pyroxene and spineltype crystal phases, articles made from such glass-ceramics, and methods for producing the glass-ceramic articles.

Glass-ceramic articles have been marketed commercially for over 30 years. U.S. Pat. No. 2,920,961 (Stookey) originally discloses the preparation of glass-ceramic articles through the heat treatment of precursor glass bodies. As explained therein, such articles are prepared in three general steps: (1) a glass forming batch, customarily containing a nucleating agent, is melted; (2) that melt is simultaneously cooled to a temperature below the transformation range of the glass and an article is shaped therefrom; and, (3) that glass article is heat treated at temperatures above the annealing point of the glass and, frequently, above the softening point of the glass for a sufficient length of time to cause the glass to crystallize in situ. The heat treatment can be so scheduled as to control the size and, in some instances, the identity of the crystals developed. Therefore, the crystallization present in a glass-ceramic article can be the result of both the base composition of the precursor glass and the heat treatment the glass body is subjected to.

Glass-ceramic articles containing a spinel-type crystal phase were originally disclosed in U.S. Pat. No. 3,268,3 15 (Stookey). This patent discloses a method for forming a glass-ceramic material consisting essentially, expressed in terms of weight percent on the oxide basis, of 40–70% $SiO_2$, 14–34% $Al_2O_3$, 8–27% MgO, and 0.4–2.5% $Cr_2O_3$, with the total of these constituents constituting at least 95% by weight of the glass material, and subsequent glass-ceramic. The patent further discloses that the glass-ceramic exhibits a crystallization consisting essentially of at least one crystal phase selected from the group consisting of a magnesium metasilicate (enstatite) and a spinel.

U.S. Pat. No. 4,687,749 (Beall) dicloses glass-ceramic articles wherein enstatite constitutes the predominant crystal phase. These articles exhibit a high modulus of rupture, a use temperature in excess of 1200° C., and a high fracture toughness. They consist essentially, expressed in terms of weight percent on the oxide basis, of about 20–35% MgO, 2–12% $Al_2O_3$, 40–70% $SiO_2$, and at least one metal oxide in the indicated proportions selected from the group consisting of 0–2% $Li_2O$, 0–4% CaO, 0–12% SrO and 0–17% BaO, at least 0.5% $Li_2O$ being required when present alone and at least 1% SrO and/or BaO being required in the absence of $Li_2O$. The compositions include 5–15% $TiO_2$ and/or $ZrO_2$ for nucleation purposes.

Glass-ceramic materials have found utility in such varied products as cookware, tableware, missile nose cones, protective shields and industrial applications. Recently, an interest has arisen in producing a rigid, glass-ceramic disk as a substrate upon which a layer of magnetic media can be deposited. The ultimate product is an information disk to cooperate with a head pad in a magnetic memory storage device.

Our copending, related application Ser. No. 08/332,703 describes glass-ceramics having technical properties particularly well suited to producing an information disk substrate. As indicated above, these materials provide good fracture toughness and Knoop hardness values and a Young's modulus of $14-24 \times 10^6$ psi, and capable of taking a fine polish.

The last mentioned property is particularly important in producing an information disk. Such a disk must be ultra-smooth to permit proper operation of a memory device. The difficulty in obtaining the desired ultra-smooth surface is a major concern in substrate production. Glass-ceramic blanks may be formed in known manner and are then ground and polished to meet the ultra-smooth requirements. This, of course, is a time-consuming, and hence expensive, operation.

While the spinel-type glass-ceramic materials provide the desired technical properties, it would, of course, be desirable to further enhance these properties. More important, though, is the difficulty encountered in polishing these spinel-type materials. While the desired degree of smoothness can be obtained, the time required to do so is unduly long.

It is then a basic purpose of the present invention to provide modified glassceramic materials that improve on the known spinel-type materials. In particular, it is purpose to provide such modified materials that maintain, or improve on, the technical properties while providing a material that is easier to polish.

SUMMARY OF THE INVENTION

The glass-ceramic materials of the present invention exhibit an abraded MOR of at least 15,000 psi, a Knoop hardness value of at least 775 and a fracture toughness in excess of 1.0 MPam$^{1/2}$, have a Mg-rich pyroxene crystal phase and a spinel-type crystal phase as predominate crystal phases uniformly dispersed within a highly siliceous residual glass matrix, and having a composition at least 92% of which consists essentially of, as calculated in weight percent on an oxide basis, 35–60% $SiO_2$, 10–30% $Al_2O_3$, 12–30% MgO, 0–10% ZnO, 5–20% $TiO_2$, and 0–8% NiO.

DESCRIPTION OF THE INVENTION

The present invention arose from attempts to improve the spinel-type glass-ceramics disclosed in our prior application. In particular, our efforts were directed at improving the polishing characteristics of the material while retaining, or improving on, other relevant properties.

We have now found that we can introduce a Mg-rich pyroxene, namely, solid solutions in the neighborhood of enstatite ($MgSiO_3$), as a predominant crystal phase along with a spinel-type predominant crystal phase ($MgAl_2O_4$). This is accomplished by decreasing the $Al_2O_3$ and ZnO contents of our prior compositions, and enhancing the MgO content. It is apparent that the principal oxide constituents of the two materials are essentially the same, but that certain content ranges are substantially changed. Much to our surprise, these seemingly minor changes not only produced a new predominant crystal phase along with improved technical properties, but enabled us to obtain an equivalent ultra-fine polished surface in half the time.

The composition of the precursor glasses, and the subsequently formed glassceramics of our invention consist essentially, expressed in terms of weight percent on the oxide basis, 35–60% $SiO_2$, 10–30% $Al_2O_3$, 12–30% MgO, 0–10% ZnO, 5–20% $TiO_2$ and 0–8 % NiO. The $Al_2O_3$ content should not exceed 25 % unless NiO is present in an amount greater than 2 %. The composition may also include up to 5% of optional constituents selected from the group consisting of BaO, CaO, PbO, SrO, $P_2O_5$, $B_2O_3$, $Ga_2O_3$, $R_2O$, and F, and up to 8 % of optional constituents selected from the group consisting of transition metal oxides, (lanthanides), ZrO, $NbO_2$, $Bi_2O_3$, and $Ta_2O_5$. Up to 2% $Sb_2O_3$, and/or $As_2O_3$ may be present as fining agent. The $R_2O$ amount is selected from the group consisting of $Na_2O$, $K_2O$, $Rb_2O$, $Cs_2O$ while, preferably, the transition metal oxide is selected from the group consisting of the oxides of Cu, Co, Fe, Mn, Cr, Sn and V; if the oxide of Cr is present, it should not exceed about 1% of the glass composition.

Preferably, the compositions of the precursor glasses, and ultimately the glassceramics, consist essentially, expressed in terms of weight percent on the oxide basis, of about 44–53% $SiO_2$, 15–24% $Al_2O_3$, 15–22% MgO, 0–5% ZnO, 9–14% $TiO_2$., 0–3% NiO. $TiO_2$ should be greater than 10% unless NiO is present.

In practicing our invention, a glass batch of the desired composition is formulated, mixed and melted. The glass melt is formed into a glass shape of a predetermined configuration utilizing conventional glass forming techniques. Once the glass shape is formed, it is heat treated in accordance with a pre-designed schedule to induce nucleation and the growth of crystals on the nuclei. Thereafter, where necessary, the crystallized article is finished to precise dimensions and desired surface texture. Specifically, the glass article is heated to a temperature range of about 750–50° C. at a temperature rate of approximately 300° C./hour and thereafter maintained at the temperature for a time sufficient to cause the article to obtain a high degree of nucleation. Once nucleated, the glass article is then heated to a temperature in the range of about 900°–1100° C. at a temperature rate of approximately 300° C./hour. The glass article is maintained at that temperature for a time sufficient to cause the article to crystallize in situ forming a crystallized glass article which exhibits a crystal phase assemblage comprised predominately of spinel crystals and Mg-rich pyroxene crystals.

More specifically, the glass-ceramic articles formed will exhibit a crystal phase assemblage that may be comprised predominately of uniformly-sized spinel and pyroxene crystals exhibiting ultra-fine grains. Predominately, as used herein, indicates that the spinel and pyroxene crystals are present in a greater amount than any of the other accessory crystal phases which may be exhibited by the inventive glass-ceramic. Preferably, the spinel crystal phase is an aluminate ($MgAl_2O_4$) and the pyroxene phase is enstatite or a neighboring solid solution.

The crystal content may range from about 25 % up to about 70% by weight of the glass-ceramic article, there being a substantial glassy matrix. The spinel and pyroxene phases predominate. However, the assemblage may also contain significant amounts of magnesium dititanate ($MgTi_2O_5$) or magnesium aluminum titanate crystals of the solid solution $MgTi_2O_5$-$Al_2TiO_5$. The amounts of these titanate crystals will depend on the amount of titania intially batched as a nucleating agent, and may range up to about 15 % by weight of the article.

Crystal size is dependent to some extent on composition and the crystallization cycle. In general, the spinel crystals, in their largest dimension, tend to be no larger than about 500Å. The pyroxene crystals are somewhat larger, but tend to be no greater than about 1500Å.

Enstatite is a member of the pyroxene family of single chain silicates, which can be represented by the chemical formula $(M2)(M1)Si_2O_6$. Pyroxenes encompass a wide range of chemistries and solid solutions. The M2 site, with a coordination of 6–8 oxygen atoms, typically contains divalent ions such as $Mg^{2+}$, $Fe^{2+}$, $Ni^{2+}$, and $Ca^{2+}$, but can also contain $Na^+$. The smaller octahedrally-coordinated site, M1, can contain $Mg^{2+}$, $Fe^{2+}$, $Fe^{3+}$, $Ni^{2+}$, $Al^{3+}$, or even $Ti^{4+}$. In our inventive materials, we are concerned with solid solutions close in composition to enstatite, $Mg_2Si_2O_6$.

The major phases of spinel, enstatite and titanate may be accompanied by minor amounts of rutile ($TiO_2$), petalite solid solution (s.s.), stuffed β-quartz or α-quartz, or cordierite.

The fine-grained nanocrystalline glass-ceramics of the present invention provide a number of significant advantages, when compared with the predominantly spinel glass-ceramics disclosed in our copending, related application, while exhibiting no apparent disadvantages. This is because the spinel-type crystal phase of the earlier materials is retained as a predominant crystal phase in the present materials. At the same time, the new enstatite solid solution is also of a nanocrystalline nature.

The present glass-ceramics provide both improved strength and toughness values. The modulus of rupture (MOR) values on abraded samples consistently exceed 15,000 psi. Toughness fracture values exceed 1.0 $MPam^{1/2}$, and frequently exceed 1.5 these values are remarkably high considering the ultra-fine grain size of the crystalline microstructure. They are thought to result from the lamellar twinning that characterizes the enstatite crystals. It is believed that this structure deflects cracks in the material and absorbs energy, thus resisting fracture.

The higher MgO levels in the present glass-ceramics impart high Young's modulus (modulus of elasticity) values that generally exceed 20 Msi. Also, in spite of the diminished spinel content in the present materials, Knoop hardness values in excess of 775 are typically encountered.

The most significant feature of the present glass-ceramics, from a commercial standpoint, is their easier polishability. This feature is critical in the production of rigid disk substrates for magnetic memory devices. By way of example, a preferred embodiment of the present material may be given an equivalent fine polish in half the time required for a similarly preferred embodiment of the prior spinel material.

This difference in polishability may be attributed in part to relative "softness" of enstatite as compared to spinel. The Mohs hardness values, respectively, are 5.5 and 8. However, there is surprisingly little difference in bulk Knoop hardness between the spinel-based and the enstatite/spinel glass-ceramics.

The higher fracture toughness values for the present materials having a predominant enstatite phase is thought to also play a key role in the superior polishing performance. It is believed that the blunting and deflection of cracks provided by the lamellar twinning of the enstatite crystals limits the depth of the sub-surface damage produced in the substrate during grinding and lapping. This leaves less damage to be removed by the polishing process.

Of importance in melting the precursor glass, the present materials tend to have fewer platinum inclusions. Also, they exhibit lower liquidus temperatures as the cotectic trough between cordierite and enstatite in the $SiO_2$-$Al_2O_3$-MgO phase diagram is approached.

SPECIFIC EMBODIMENTS

TABLE I sets forth a series of compositions for precursor glasses, and glassceramics produced therefrom, that exemplify the present invention. These compositions are presented in approximate weight percent as calculated on an oxide basis.

A batch corresponding to each composition in TABLE I was formulated employing normal batch materials, such as sand and metal oxides, carbonates and nitrates.

TABLE I

| Oxide | 1 | 2 | 3 | 4 | 5 | 6 | 7 |
|---|---|---|---|---|---|---|---|
| $SiO_2$ | 47.1 | 48.2 | 47.5 | 47.7 | 48.8 | 49.4 | 49.6 |
| $Al_2O_3$ | 22.1 | 17.2 | 17.0 | 19.6 | 14.9 | 12.5 | 11.2 |
| MgO | 16.9 | 21.0 | 20.3 | 18.9 | 23.0 | 25.0 | 26.1 |
| ZnO | 1.7 | 1.2 | 1.2 | 1.4 | 1.1 | 0.9 | 0.8 |
| $TiO_2$ | 12.3 | 12.3 | 12.3 | 12.2 | 12.3 | 12.3 | 12.3 |
| SrO | — | — | 1.8 | — | — | — | — |
| CaO | — | — | — | — | — | — | — |
| NiO | — | — | — | — | — | — | — |

| Oxide | 8 | 9 | 10 | 11 | 12 | 13 | 14 |
|---|---|---|---|---|---|---|---|
| $SiO_2$ | 46.8 | 47.5 | 47.8 | 48.0 | 46.0 | 47.0 | 48.0 |
| $Al_2O_3$ | 16.7 | 17.2 | 17.0 | 18.4 | 25.0 | 20.0 | 19.0 |
| MgO | 19.6 | 20.1 | 19.0 | 20.0 | 15.0 | 20.0 | 19.0 |
| ZnO | 1.2 | 1.2 | 1.2 | 1.3 | 3.0 | 2.0 | 2.0 |
| $TiO_2$ | 12.3 | 12.2 | 12.3 | 12.3 | 8.0 | 9.0 | 9.0 |
| SrO | 3.5 | 0.9 | — | — | — | — | — |
| CaO | — | 0.9 | 2.6 | — | — | — | 1.0 |
| NiO | — | — | — | — | 3.0 | 2.0 | 2.0 |

The batch materials were thoroughly mixed together in order to secure a homogeneous melt, and subsequently placed into silica and/or platinum crucibles. The crucibles were placed into a furnace and the glass batch was then melted and maintained at temperatures ranging from 1500°–1650° C. for times ranging from about 6–16 hours. The melts were thereafter poured into steel molds to yield glass slabs having dimensions of approximately ~10×20×1¼ cm (4"×8"×½). Subsequently, those slabs were transferred immediately to an annealer operating at about 650°–750° C. Samples were held at this temperature for about 1–3 hours and subsequently cooled overnight.

Two sets of glass test pieces representing each melt were prepared. Each of the two sets was subjected to a different heat treating schedule to produce glass-ceramic, that is crystallized glass, test pieces. Each set of test pieces was heated to 800° C., and held for 2 hours at that temperature to nucleate the glass. One set was then heated to 1025° C., and held at that temperature for 4 hours to cause crystallization to occur on the nuclei. The second set was heated to 975° C., and was held at that temperature for 4 hours to cause uniform crystallization of the glass.

Several relevant properties were measured on selected test pieces from each set. TABLE II reports these properties with the example numbers corresponding to those in TABLE I.

TABLE II

| | 1 | 3 | 8 | 9 | 10 | 11 |
|---|---|---|---|---|---|---|
| HT | 800/2 1025/4 | 800/2 1025/4 | 800/2 1025/4 | 800/2 1025/4 | 800/2 975/4 | 800/2 975/4 |
| MOR (abr) Ksi | 15.5 | 15.3 | 14.3 | 15.9 | 13.0 | 16.0 |
| KHN | 776 | 807 | 826 | 871 | 772 | — |
| E-modulus ×10⁶ psi | 20.9 | 22 | 21.2 | 22.7 | 21.2 | 21.5 |
| $K_{IC}$ MPa(m)$^{-½}$ | 1.3 | 2.03 | 1.55 | 1.65 | 1.57 | — |
| αT (×10⁻⁷/°C.) | 66.9 | | | | | |

Also test pieces were ground, lapped and polished using standard techniques in order to study polishing times as well as to allow the surface and the microstructure to be studied using standard analytical techniques. Included among such analytical techniques are scanning electron microscopy (SEM), replica electron microscopy (REM), atomic three microscopy (AFM), etc.

Table II reports the heat treatment schedule the precursor glass examples were subjected to (H.T.), the elastic or Young's modulus (E), the coefficient of thermal expansion (C.T.E.), the Knoop hardness (KHN), the fracture toughness ($K_{IC}$) and the modulus of rupture of an abraded sample (MOR).

It will be recognized that, whereas the above description is drawn to laboratory practice, the glasses operable in the invention described herein can be melted in large scale/commercial melting tanks and formed into desired shapes using conventional glass melting techniques and forming processes. It is only necessary that the compositions be fired at sufficiently high temperatures and for a sufficient length of time to produce a homogeneous melt. Thereafter, the melt is cooled and simultaneously shaped into a glass body which is customarily annealed.

Moreover, it should be recognized that various heat-treatment cycles and compositions may be used to produce different microstructures or crystal phase assemblages. However, all of the Examples shown in TABLE I produce spinel and Mg-rich pyroxene crystals as predominate crystal phases.

It should be noted that, the properties which the inventive glass-ceramic material disclosed herein possesses render it eminently suitable for use in a magnetic memory storage device comprised of a head pad and rigid information disk. Specifically, the glassceramic is used in the rigid information disk as the rigid disc substrate which possesses a layer of magnetic media on its surface. In other words, the substrate would be comprised of the inventive glass-ceramic material exhibiting the crystal phase assemblage comprised predominately of spinel and pyroxene crystals.

Based on its overall combination of properties, i.e., an elastic modulus of 20.9×10$^{+6}$ psi, a fracture toughness of 1.3 MPa.m$^{1/2}$ and a Knoop Hardness number of 776 and a MOR(abraded) of 15,500 psi, example 1 of TABLE I is deemed to be the most preferred composition.

We claim:
1. A glass-ceramic article exhibiting an MOR of at least about 15,000 psi, a Knoop hardness value of greater than at least about 760 KHN, a Young's modulus about 20×10⁶ psi and a fracture toughness in excess of 1.0 MPa.m$^{1/2}$, wherein the crystal phase assemblage is comprised predominately of magnesium containing crystals having a pyroxene structure represented by the formula $(M_2)(M_1)Si_2O_6$ where $M_2$ has a coordination of 6–8 oxygen atoms and $M_1$ is octahedrally coordinated and spinel crystals which are uniformly dispersed within a highly siliceous residual glass matrix phase, the article having an overall composition at least 92 % of which consists essentially, expressed in terms of weight percent on the oxide basis, of 35–60% $SiO_2$, 10–30% $Al_2O_3$, 12–30% MgO, 0–10% ZnO, 5–20% $TiO_2$, and 0–8% NiO.

2. The glass-ceramic article according to claim 1 wherein the composition additionally contains a transition metal oxide selected from the group consisting of the oxides of Cu, Co, Fe, Mn, Cr, Sn and V, the oxide of Cr not exceeding about 1%.

3. A glass-ceramic article according to claim 1 wherein the pyroxene crystals exhibit dimensions less than about 1500 Å.

4. A glass-ceramic article according to claim 1 wherein the spinel crystals exhibit dimensions less than about 500 Å.

5. A glass-ceramic article according to claim 1 wherein the pyroxene crystal phase in the crystal phase assemblage is enstatite or an enstatite solid solution.

6. A glass-ceramic article according to claim 1 wherein the spinel crystals are primarily $MgAl_2O_4$.

7. A glass-ceramic article according to claim 1 wherein the composition consists essentially, expressed in terms of weight percent on the oxide basis, of 44–53% $SiO_2$, 15–24% $Al_2O_3$, 15–22% MgO, 0–5% ZnO, 9–14% $TiO_2$, and 0–3% NiO.

8. A glass-ceramic article according to claim 1 wherein the crystal phase assemblage further contains up to about 15% by weight titanate crystals.

9. A glass-ceramic article according to claim 1 wherein the $Al_2O_3$ content in the composition does not exceed 25% unless NiO is present in an amount greater than 2%.

10. A method for making a glass-ceramic article which comprises the steps of
 a. melting a batch for a glass composition at least 92% of which consists essentially, expressed in terms of weight percent on the oxide basis, of 35–60% $SiO_2$, 10–30% $Al_2O_3$, 12–30% MgO, 0–10% ZnO, 5–20% $TiO_2$, and 0–8% NiO,
 b. heating the glass article to a temperature range of about 750°–850° C.,
 c. maintaining the temperature for a time sufficient to cause the article to obtain a high degree of nucleation,
 d. heating the glass article to a temperature range about 900°–1100° C. and,
 e. maintaining the temperature for a time sufficient to cause the article to crystallize in situ forming a crystallized glass article which exhibits crystal phase assemblage comprised predominately of generally uniformly-sized magnesium containing crystals having a pyroxene structure represented by the formula $(M_2)(M_1)Si_2O_6$ where $M_2$ has a coordination of 6–8 oxygen atoms and $M_1$ is octahedrally coordinated and spinel crystals which are uniformly dispersed within a highly siliceous residual glass matrix phase.

11. The method according to claim 10 wherein the glass composition additionally contains a transition metal oxide selected from the group consisting of the oxides of Cu, Co, Fe, Mn, Cr, Sn and V, the oxide Cr not exceeding about 1%.

12. The method according to claim 10 wherein the pyroxene crystals exhibit dimensions less than about 1500 Å in diameter.

13. The method according to claim 10 wherein the spinel crystals exhibit dimensions less than about 500 Å in diameter.

14. The method according to claim 10 wherein the period of time sufficient to cause the article to obtain a high degree of nucleation is at least 1 hour and the period of time sufficient to cause the article crystallize in situ ranges between about 1–4 hours.

15. The method according to claim 10 wherein the crystal phase assemblage contains primary crystal phases of enstatite or enstatite solid solution and $MgAl_2O_4$, and additionally contains a titanate crystal phase.

16. A rigid information disk for use in a magnetic memory storage device consisting essentially of a substrate with a coating of magnetic media on a surface thereof, wherein the substrate is comprised of a glass-ceramic material exhibiting an MOR of at least about 15,000 psi, a Knoop hardness value of greater than at least about 760 KHN, a Young's modulus about $20 \times 10^6$ psi and a fracture toughness in excess of 1.0 $MPa.m^{1/2}$, wherein the crystal phase assemblage is comprised predominately of magnesium containing crystals having a pyroxene structure represented by the formula $(M_2)(M_1)Si_2O_6$ where $M_2$ has a coordination of 6–8 oxygen atoms and $M_1$ is octahedrally coordinated and spinel crystals which are uniformly dispersed within a highly siliceous residual glass matrix phase, the substrate having an overall composition at least 92 % of which consists essentially, expressed in terms of weight percent on the oxide basis, of 35–60% $SiO_2$, 10–30% $Al_2O_3$, 12–30% MgO, 0–10% ZnO, 5–20% $TiO_2$, and 0–8% NiO.

17. A rigid information disk according to claim 16 wherein the substrate composition additionally contains a transition metal oxide selected from the group consisting of the oxides of Cu, Co, Fe, Mn, Cr, Sn and V, the oxide Cr not exceeding about 1%.

18. A rigid information disk according to claim 16 wherein the pyroxene crystals exhibit dimensions less than about 1500 Å.

19. A rigid information disk according to claim 16 wherein the spinel crystals exhibit dimensions less than about 500 Å.

20. A rigid information disk according to claim 16 wherein the pyroxene crystal phase in the crystal phase assemblage is enstatite or an enstatite solid solution.

21. A rigid information disk according to claim 16 wherein the spinel crystals are primarily $MgAl_2O_4$.

22. A rigid information disk according to claim 16 wherein the composition consists essentially, expressed in terms of weight percent on the oxide basis, of 44–53% $SiO_2$, 15–24% $Al_2O_3$, 15–22% MgO, 0–5% ZnO, 9–14% $TiO_2$, and 0–3% NiO.

23. A rigid information disk according to claim 16 wherein the crystal phase assemblage further contains up to about 15% by weight titanate crystals.

24. A rigid intimation disk according to claim 16 wherein the $Al_2O_3$ content in the composition does not exceed 25% unless NiO is present in an amount greater than 2%.

* * * * *